US00RE46313E

(19) United States
(12) Reissued Patent
Johnson et al.

(10) Patent Number: US RE46,313 E
(45) Date of Reissued Patent: Feb. 21, 2017

(54) WELDING CART

(71) Applicants: Travis Johnson, Eagan, MN (US); David Anderson, Appleton, WI (US)

(72) Inventors: Travis Johnson, Eagan, MN (US); David Anderson, Appleton, WI (US)

(73) Assignee: Northern Tool & Equipment Company, Inc., Burnsville, MN (US)

(21) Appl. No.: 29/492,097

(22) Filed: May 28, 2014

Related U.S. Patent Documents

Reissue of:
(64) Patent No.: Des. 629,028
Issued: Dec. 14, 2010
Appl. No.: 29/360,173
Filed: Apr. 21, 2010

(51) LOC (10) Cl. ..... 15-09
(52) U.S. Cl.
USPC ..... D15/144
(58) Field of Classification Search
USPC ..... D15/144, 144.1, 144.2; D34/12–27; 219/136; 414/444, 448, 466, 469, 546; 280/47.131, 47.19, 47.26, 47.27, 47.33, 280/47.34, 47.35, 79.5, 79.6, 79.7
See application file for complete search history.

(56) References Cited

U.S. PATENT DOCUMENTS 2,891,802 A * 6/1959 Moran ..... 280/654
D202,616 S 10/1965 Larson
(Continued)

*Primary Examiner* — Phillip S Hyder

(74) *Attorney, Agent, or Firm* — Patterson Thuente Pedersen, P.A.

(57) CLAIM

The ornamental design for a welding cart, as shown and described.

DESCRIPTION

[FIG. 1 is a front perspective view of a welding cart according to the invention;]
[FIG. 2 is a top plan view of the welding cart depicted in FIG. 1;]
[FIG. 3 is a left side elevation view of the welding cart depicted in FIG. 1;]
[FIG. 4 is a right side elevation view of the welding cart depicted in FIG. 1;]
[FIG. 5 is a front elevation view of the welding cart depicted in FIG. 1; and,]
[FIG. 6 is a rear elevation view of the welding cart depicted in FIG. 1.]
*FIG. 7 is a front perspective view of a welding cart according to an embodiment of the invention;*
*FIG. 8 is a top plan view of the welding cart depicted in FIG. 7;*
*FIG. 9 is a left side elevation view of the welding cart depicted in FIG. 7;*
*FIG. 10 is a right side elevation view of the welding cart depicted in FIG. 7;*
*FIG. 11 is a front elevation view of the welding cart depicted in FIG. 7; and,*
*FIG. 12 is a rear elevation view of the welding cart depicted in FIG. 7.*
*The broken lines depict portions of the welding cart in which the design is embodied that are not considered part of the claimed design.*

1 Claim, 8 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| 4,726,485 | A | * | 2/1988 | Bailey | 220/6 |
| D322,501 | S | * | 12/1991 | Legault | D34/24 |
| D330,789 | S | * | 11/1992 | Powell | D34/5 |
| D361,643 | S | * | 8/1995 | Snell | D34/21 |
| 6,590,184 | B1 | * | 7/2003 | Andersen | 219/136 |
| D530,875 | S | * | 10/2006 | Rosine et al. | D34/17 |
| D546,017 | S | * | 7/2007 | Wise | D34/19 |
| 7,252,297 | B1 | | 8/2007 | Barritt et al. | |
| 7,338,054 | B2 | * | 3/2008 | Pint | 280/79.2 |
| D567,464 | S | | 4/2008 | Dullum | |
| 7,357,398 | B2 | * | 4/2008 | O'Connor | 280/47.34 |
| 7,374,185 | B1 | * | 5/2008 | Hollis | 280/47.35 |
| D575,023 | S | * | 8/2008 | Girard | D34/19 |
| D598,622 | S | * | 8/2009 | Wise | D34/19 |
| D612,562 | S | * | 3/2010 | Henderson | D34/24 |

* cited by examiner

*Fig. 1* (Cancelled)
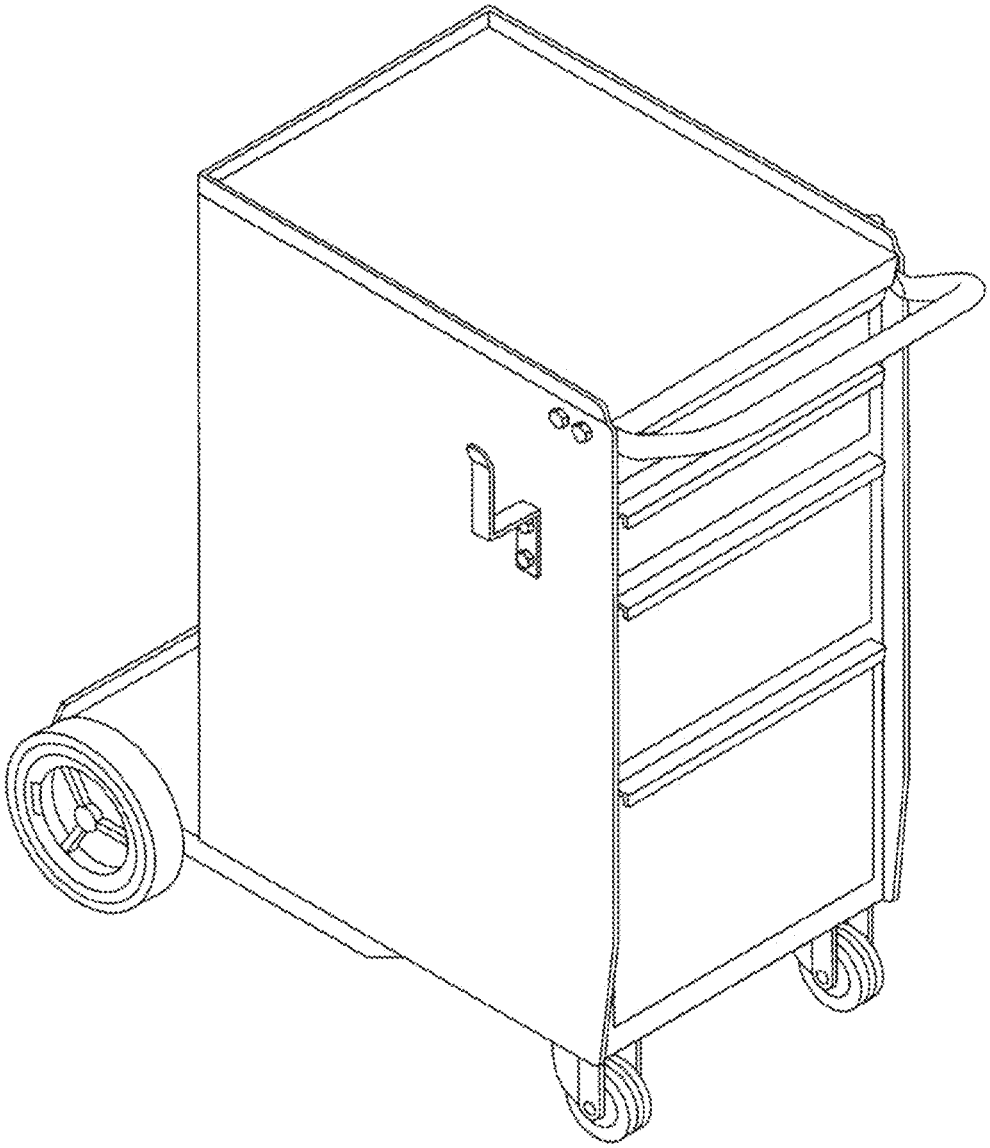

Fig. 2 (Cancelled)
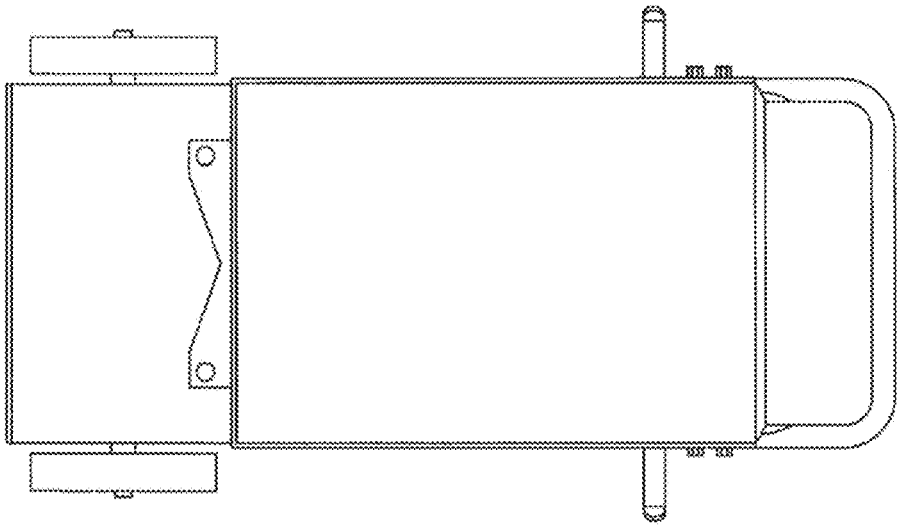
Fig. 3 (Cancelled)
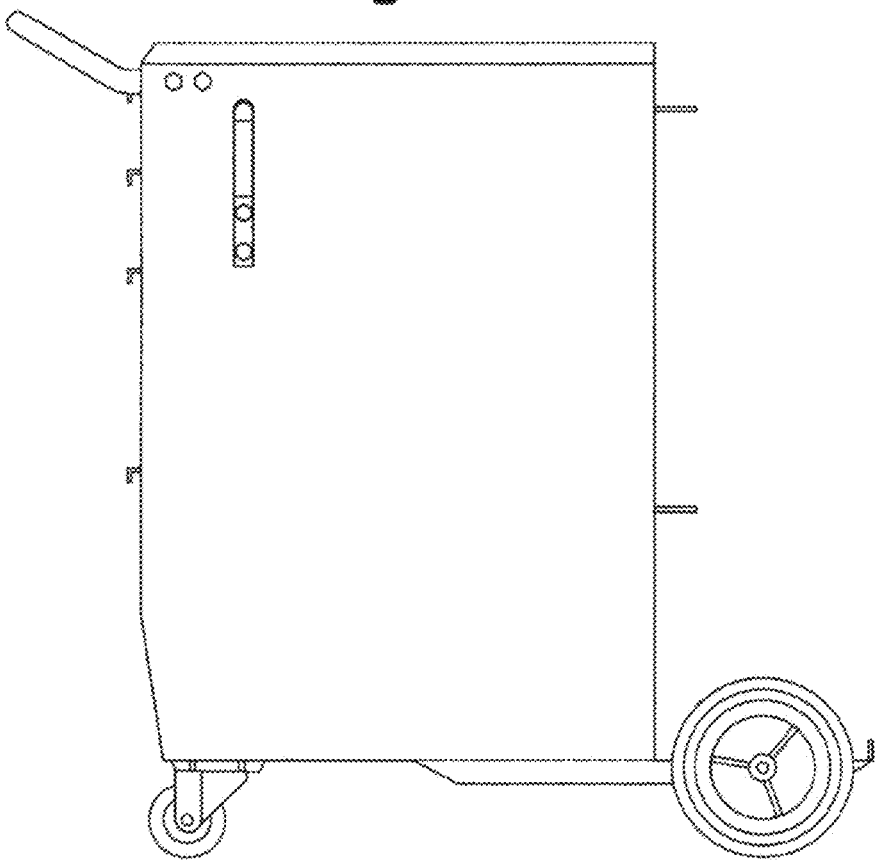

Fig. 4 (Cancelled)
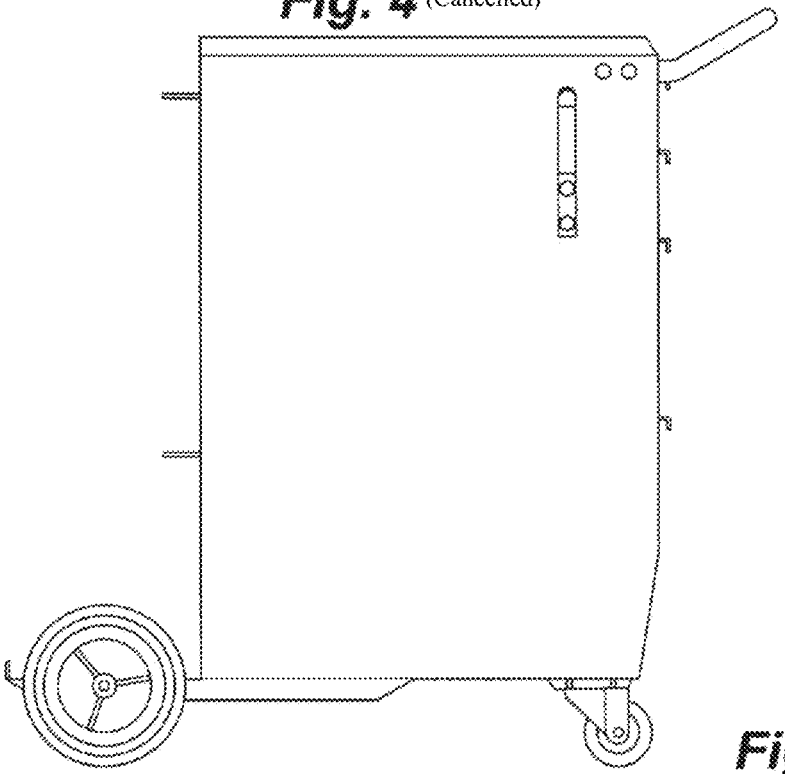
Fig. 5 (Cancelled)
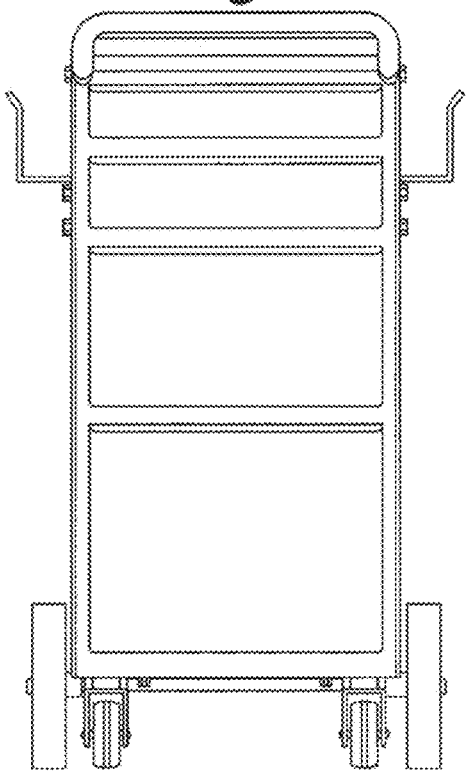

Fig. 6 (Cancelled)
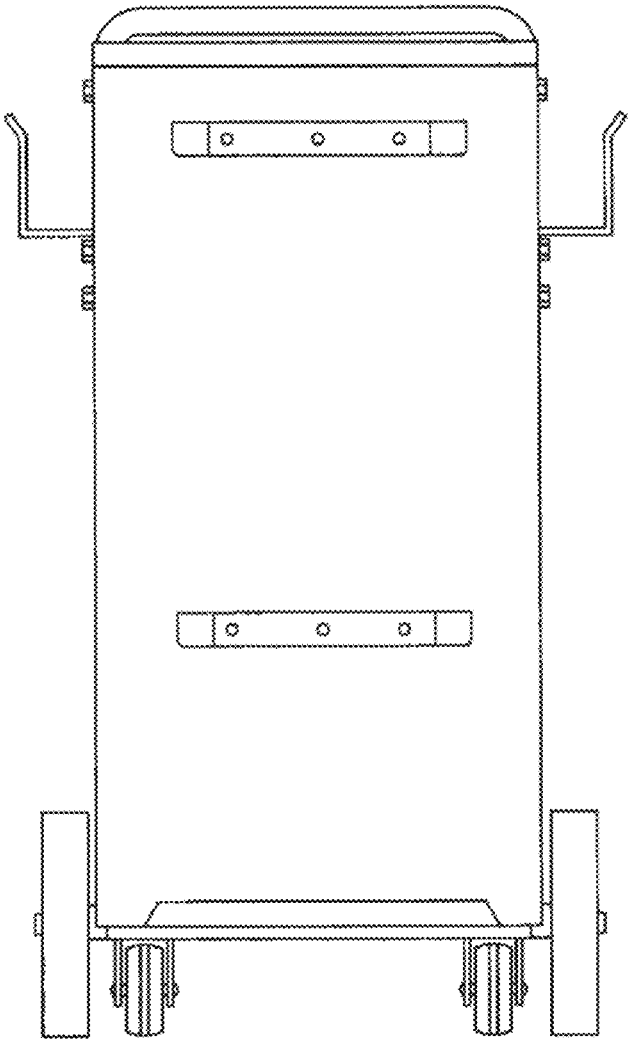

*Fig. 7* (new)
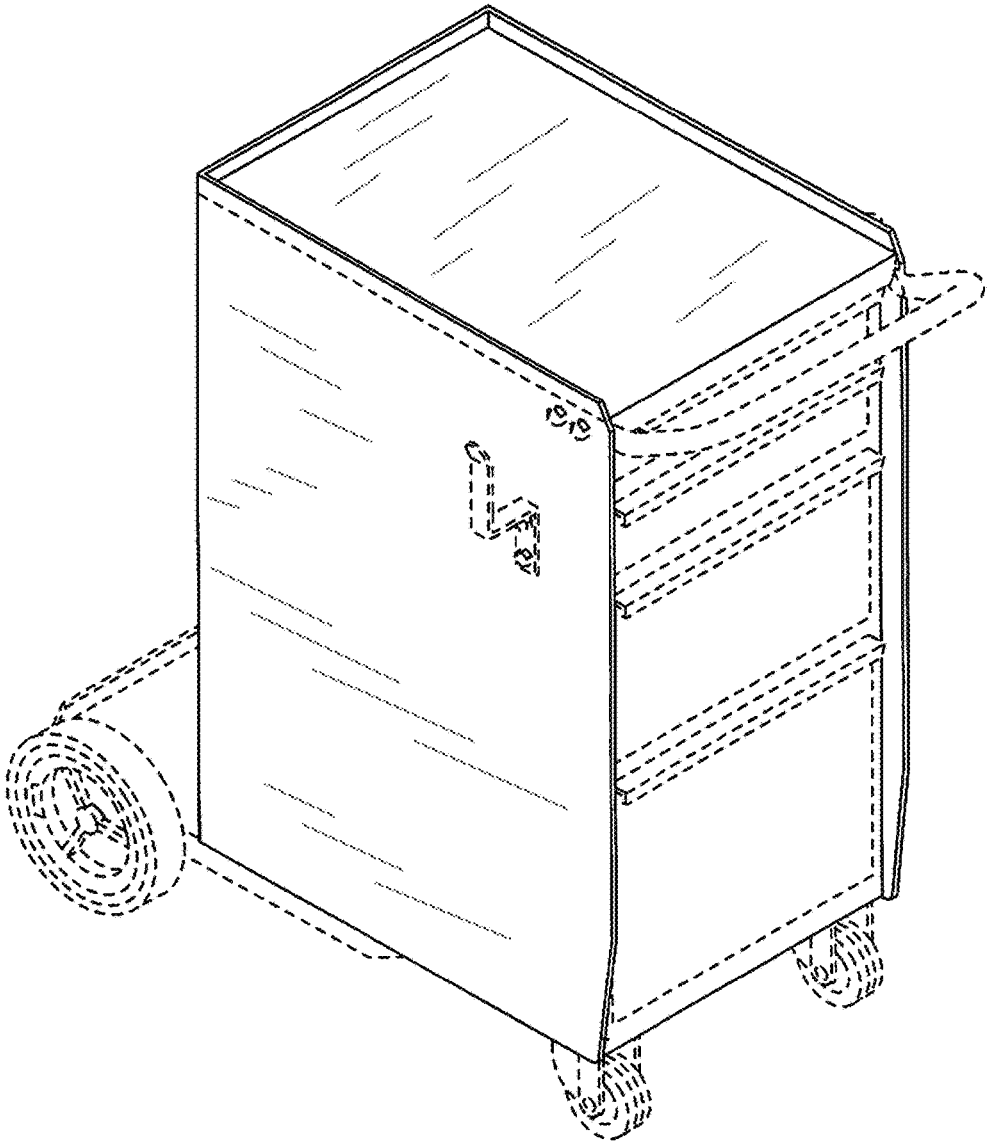

*Fig. 8* (new)
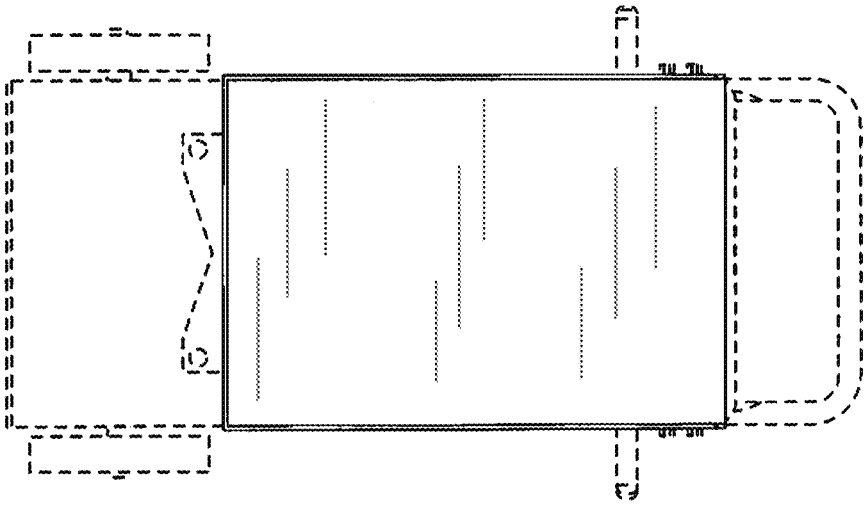
*Fig. 9* (new)
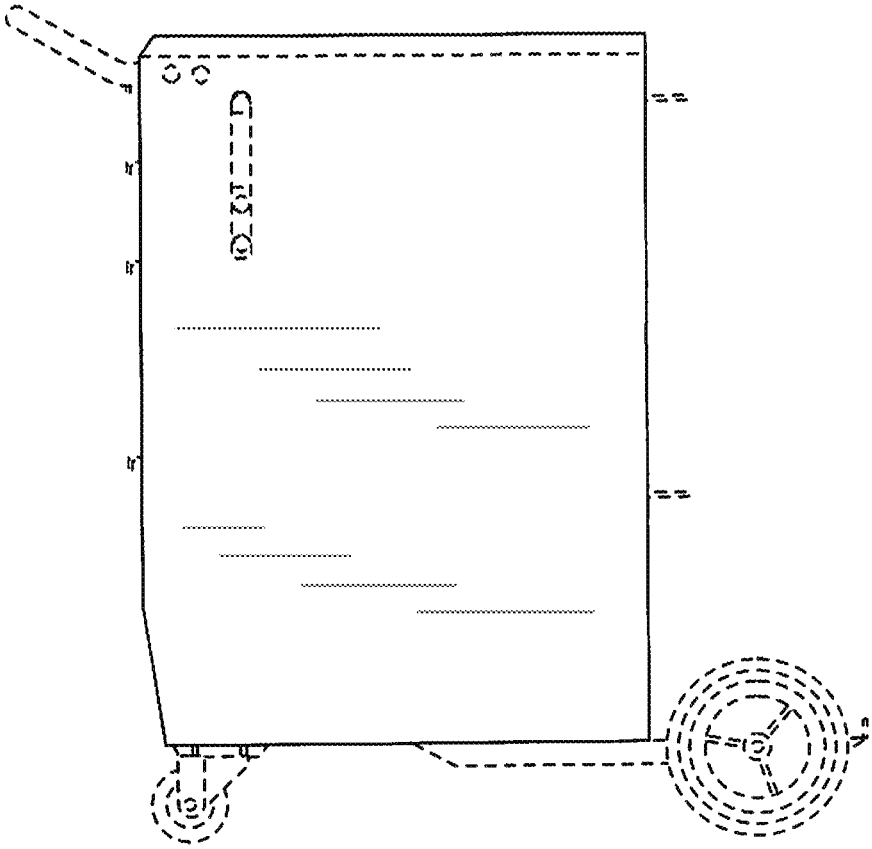

Fig. 10 (new)
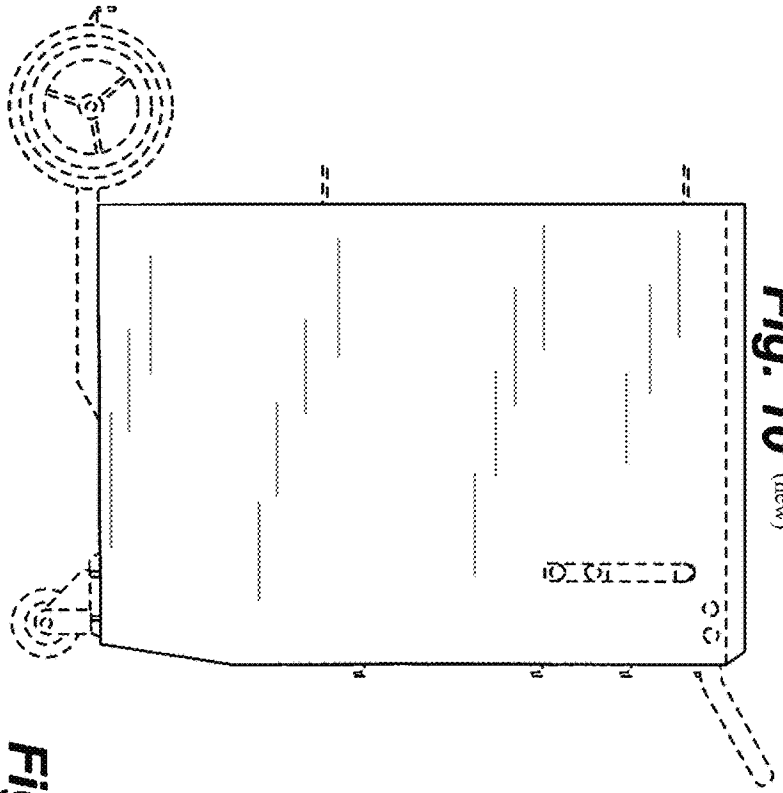
Fig. 11 (new)
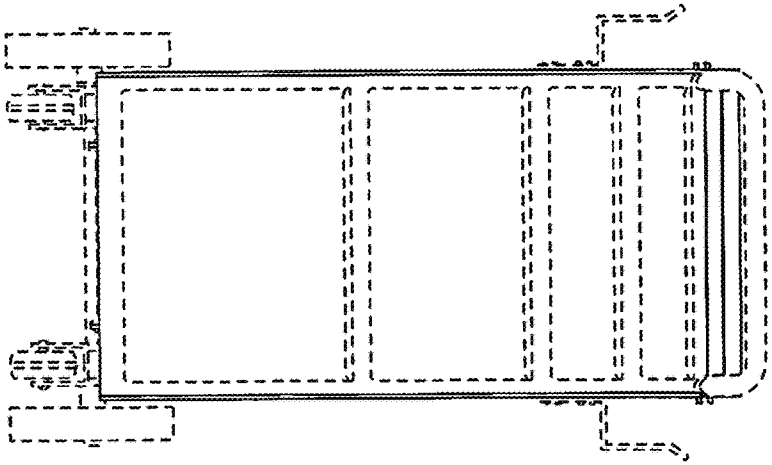

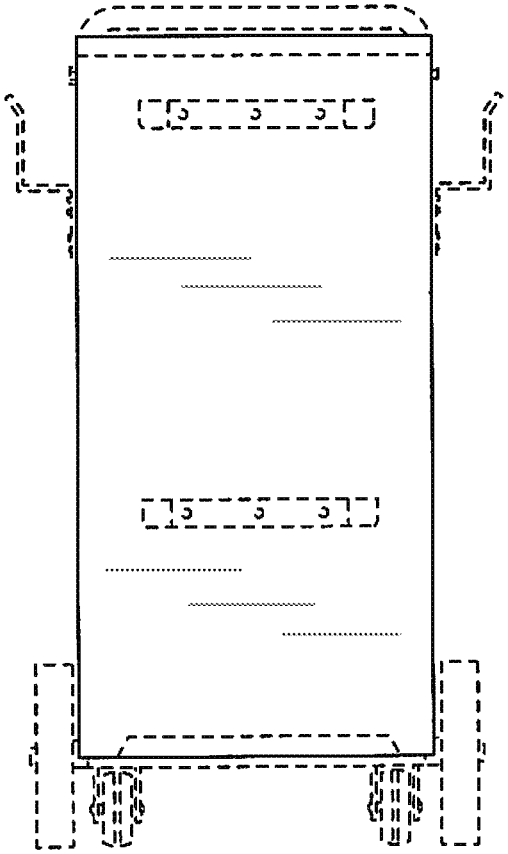

*Fig. 12* (new)